United States Patent
Jeon et al.

(10) Patent No.: US 9,598,603 B2
(45) Date of Patent: Mar. 21, 2017

(54) RESIN COMPOSITION FOR HIGH BARRIER PAPER-COATING

(71) Applicants: SK INNOVATION CO., LTD., Seoul (KR); SK GLOBAL CHEMICAL CO., LTD., Seoul (KR)

(72) Inventors: Minho Jeon, Daejeon (KR); Jieun Yoo, Daejeon (KR); Moonjung Choi, Seoul (KR); Myungahn Ok, Daejeon (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 474 days.

(21) Appl. No.: 13/682,908

(22) Filed: Nov. 21, 2012

(65) Prior Publication Data

US 2013/0129928 A1  May 23, 2013

(30) Foreign Application Priority Data

Nov. 23, 2011 (KR) .......................... 10-2011-0122591

(51) Int. Cl.
*C09D 169/00* (2006.01)
*C09D 123/06* (2006.01)
(Continued)

(52) U.S. Cl.
CPC ........... *C09D 169/00* (2013.01); *C08G 64/34* (2013.01); *D21H 19/28* (2013.01); *D21H 21/16* (2013.01)

(58) Field of Classification Search
USPC ....................................................... 524/500
See application file for complete search history.

(56) References Cited

U.S. PATENT DOCUMENTS

| 4,670,508 A | * | 6/1987 | Ohdaira | ............... C08L 101/00 524/495 |
| 6,231,965 B1 | * | 5/2001 | Takemura | ............ C08F 255/02 428/327 |

(Continued)

FOREIGN PATENT DOCUMENTS

| CN | 1786045 A | 6/2006 | |
| CN | 101328264 | * 12/2010 | ............. C08G 64/34 |

(Continued)

OTHER PUBLICATIONS

Wu et al., Journal of the American Chemical Society, 133, 15191-15199(2011).*

(Continued)

*Primary Examiner* — Ling Choi
*Assistant Examiner* — Thuy-Ai N Nguyen
(74) *Attorney, Agent, or Firm* — The Webb Law Firm

(57) ABSTRACT

Provided is a resin composition for paper-coating comprising aliphatic polycarbonate having an average molecular weight of 30,000 to 300,000 obtained by reaction of one or at least two different kinds of epoxide compounds selected from a group consisting of (C2-C10)alkylene oxide substituted or unsubstituted with carbon dioxide, halogen, or alkoxy; (C4-C20)cycloalkylene oxide substituted or unsubstituted with halogen or alkoxy; and (C8-C20)styrene oxide substituted or unsubstituted with halogen, alkoxy, alkyl or aryl, wherein it contains 0 to 40 weight % of polyolefin-based resin such as polyethylene or polypropylene, based on the total amount of the composition. In addition, the present invention relates to a paper coating method of extrusion-coating the resin composition for paper-coating on paper at 130 to 250° C. to manufacture a coated paper.

15 Claims, 1 Drawing Sheet

(51) Int. Cl.
*C09D 123/10* (2006.01)
*D21H 19/72* (2006.01)
*D21H 19/80* (2006.01)
*C08G 64/34* (2006.01)
*D21H 19/28* (2006.01)
*D21H 21/16* (2006.01)

(56) References Cited

U.S. PATENT DOCUMENTS

| | | | | |
|---|---|---|---|---|
| 2008/0234434 | A1* | 9/2008 | Lin | C08F 255/00 525/122 |
| 2010/0136356 | A1* | 6/2010 | Kelly et al. | 428/537.5 |
| 2010/0323201 | A1 | 12/2010 | Son et al. | |
| 2011/0230580 | A1* | 9/2011 | Allen | C08G 64/0208 521/172 |
| 2013/0209775 | A1* | 8/2013 | Allen | C08J 5/18 428/220 |

FOREIGN PATENT DOCUMENTS

| | | |
|---|---|---|
| KR | 10-2009-0090154 | 8/2009 |
| KR | 10-2010-0013255 | 2/2010 |
| KR | 10-2010-0067593 | 6/2010 |
| WO | 2007053597 A2 | 5/2007 |

OTHER PUBLICATIONS

Wu et al., Macromelcules, 43, 9202-9204 (2010).*
Wagnan et al., "Polymeric Material", Jan. 2009, p. 103, China Light Industry Publishers.

* cited by examiner

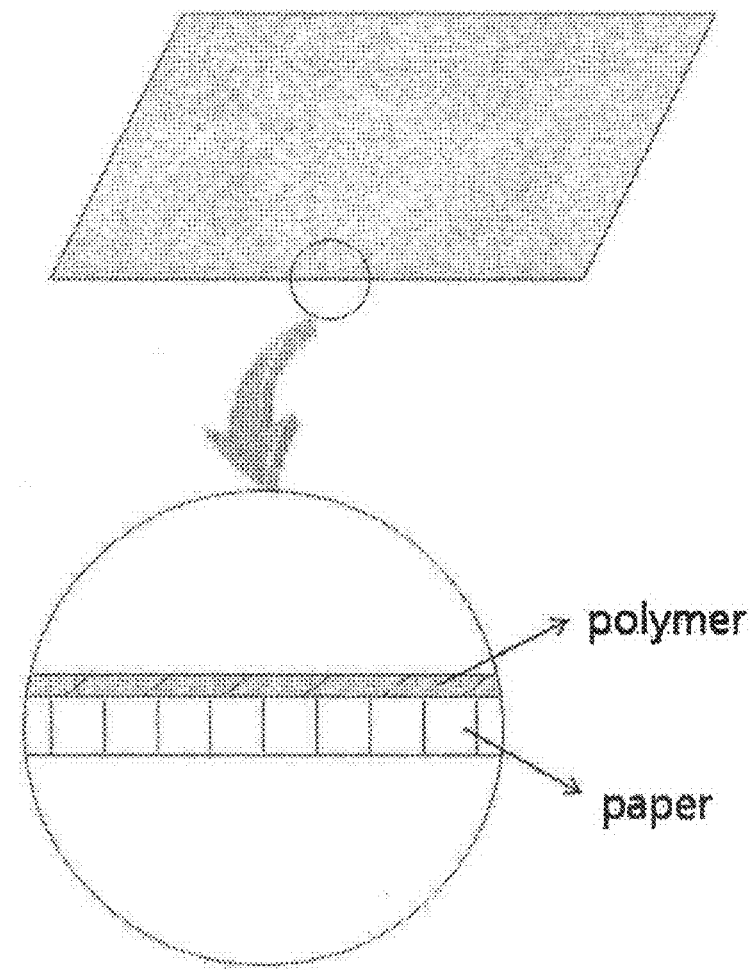

RESIN COMPOSITION FOR HIGH BARRIER PAPER-COATING

CROSS-REFERENCE TO RELATED APPLICATIONS

This application claims priority under 35 U.S.C. §119 to Korean Patent Application No. 10-2011-0122591, filed on Nov. 23, 2011, in the Korean Intellectual Property Office, the disclosure of which is incorporated herein by reference in its entirety.

TECHNICAL FIELD

The following disclosure relates to a resin composition for high barrier paper-coating.

BACKGROUND

Due to development of scientific techniques, improvement of quality and convenience of living, use of disposables has rapidly increased. Particularly, paper coated with polymers such as polyethylene (PE) has bee used in various disposable container fields. General polyethylene coated paper is manufactured by extrusion coating polyethylene on one surface or both surfaces of paper. For this reason, the polyethylene coated paper commonly refers to paper serving to prevent outflow of contents and absorption of moisture.

The polyethylene coated paper has excellent water-barrier property to block contents from moisture. However, in the case in which a container is made of a polyethylene paper, the paper has low oxygen-barrier property, such that the contents therein may be oxidized to thereby become rotten. Therefore, in order to prevent food from being oxidized, being rotten, or the like, due to contact with oxygen and enable long-term preservation, aluminum coating layer is introduced to improve the oxygen-barrier property such as Tetra-Pak, or Nylon coating, ethylene vinyl alcohol copolymer (EVOH) coating, or the like, is performed. However, introduction of the aluminum coating layer has economical disadvantages in that aluminum is an expensive material and an expensive process is required, and the Nylon coating and EVOH coating have economical disadvantages in that Nylon and EVOH are also expensive and an additional adhesive layer is required.

In addition, polyethylene, which is a representative non-polar resin, is insufficient in terms of printability, which is importantly required as a material for packaging. Further, since polyethylene has low adhesion with the paper due to non-polarity, in order to improve the adhesion with the paper, polyethylene is extruded at a high temperature of 300 to 350° C. to be thermally oxidized, such that the thermal oxidized polyethylene should be coated on the paper while inducing polar groups on a melted surface thereof.

In addition, in the polyethylene coated paper container used for foods, a coating surface thereof may be deformed or damaged when the polyethylene coated paper container is used in a microwave oven having high power.

Therefore, coated paper having excellent oxygen barrier property, good printability, and high thermal stability has been required.

SUMMARY

An embodiment of the present invention is directed to providing an eco-friendly resin composition for high barrier paper-coating, which does not generate deformation or damage of a coating surface and has excellent oxygen barrier property and printability, and high thermal stability.

In one general aspect, a resin composition for paper-coating includes aliphatic polycarbonate having an average molecular weight of 30,000 to 300,000 obtained by reacting one or at least two different kinds of epoxide compounds selected from a group consisting of (C2-C10)alkylene oxide substituted or unsubstituted with carbon dioxide, halogen, or alkoxy; (C4-C20)cycloalkylene oxide substituted or unsubstituted with halogen or alkoxy; and (C8-C20)styrene oxide substituted or unsubstituted with halogen, alkoxy, alkyl, or aryl.

The present invention may contain 0 to 40 weight % of polyolefin-based resin based on the total amount of the composition. When the content of the contained polyolefin-based resin is in the above range, heat resistance of coated paper, workability at the time of coating, and water barrier property may be improved. When the content is higher than 40 weight %, it may be difficult to mix the composition, and oxygen barrier property may not be implemented.

The polyolefin-based resin may have melt index (MI: a flow amount of a melted resin under a load of 2.16 kg and at 230° C. for 10 minutes) of 0.5 to 100, and when the MI is out of the range, it may be difficult to uniformly mix the composition, such that it may be difficult to obtain a uniform coating-composition.

Polyolefin-based resin may contain any one or at least two selected from polypropylene, polyethylene, homo polypropylene, random polypropylene, low-density polyethylene, and linear low-density polyethylene, and more preferably, be a mixture of homo polypropylene and low-density polyethylene or a mixture of random polypropylene and low-density polyethylene. In this case, when a content of polypropylene is relatively increased, heat resistance may be improved, and when a content of polyethylene is relatively increased, thermal adhesion required for a post-process after coating may be improved. However, in any case, when the content of polyolefin is 40% or more, there may be a limitation in obtaining a uniform composition, and oxygen barrier property may be deteriorated.

According to the present invention, the aliphatic polycarbonates filed by SK Innovation Co., (Korean Patent Laid-open Publication No. 2009-0090154, No. 2010-067593, and No. 2010-0013255) may be used, and may be represented by the following Chemical Formula 1.

[Chemical Formula 1]

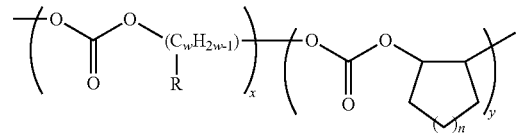

[In Chemical Formula 1, w is an integer of 2 to 10, x is an integer of 5 to 100, y is an integer of 0 to 100, n is an integer of 1 to 3, and R is hydrogen, (C1-C4)alkyl, or —CH$_2$—O—R' (R' is (C1-C8)alkyl).]

The poly(alkylene carbonate) resin may have a weight average molecular weight of 30,000 to 300,000, and more preferably, 50,000 to 150,000.

In this case, a glass transition temperature (Tg) of the poly(alkylene carbonate) resin may be 20° or more, and a melt index (MI, 150° C./5 kg) may be 0.1 to 20.

The coating having a high barrier property may be implemented by using the poly(alkylene carbonate) resin having the above range. In the case in which poly(alkylene carbonate) having a molecular weight smaller than the above molecular weight or a melt index higher than the above melt index is used, physical properties of a coating product may be deteriorated, such that it may be difficult to be used as the coating product. In addition, in the case in which poly(alkylene carbonate) having a molecular weight larger than the above molecular weight or a melt index lower than the above melt index is used, since melt viscosity may be excessively high at a temperature of 250° C. or less, which is a workable temperature range of poly(alkylene carbonate), extrusion coating properties may be significantly deteriorated, such that the desired coating rate and coating thickness may not be implemented. Further, in the case in which poly(alkylene carbonate) having a glass transition temperature lower than the above glass transition temperature (Tg), oxygen barrier property and water barrier property may be significantly deteriorated, such that a coating product having a high barrier property may not be obtained.

As needed, the resin composition for paper coating may further include additives generally used to manufacture a film or a sheet, for example, any one or at least two additives selected from a pigment, a dye, a filler, an antioxidant, a sunscreen agent, an antistatic agent, an anti-blocking agent, a slip agent, an inorganic filler, a stabilizer, a tackifier resin, a modified resin, a leveling agent, a fluorescent whitening agent, a dispersant, a heat stabilizer, a photo-stabilizer, an ultraviolet absorber, and a lubricant, and a compatibilizer for improving mixing performance between resins, but is not limited thereto.

In another general aspect, there is provided a paper coating method of extrusion-coating the resin composition for paper-coating on the paper at 130 to 250° C., and more preferably, 160 to 230° C. to manufacture a coated paper. When coating is performed at a temperature higher than the above range, coating properties may be rapidly deteriorated, and the aliphatic polycarbonate becomes severely deformed. When coating is performed at a temperature lower than the above range, a uniform melt curtain may not be formed, such that a deviation in coating thickness may be increased. In this case, a thickness may be 1 to 50 μm at the time of coating, and the properties desired in the present invention may be implemented in this range.

In the coating method, as a coating extruder, it may be preferable to use a single-screw extruder capable of providing a short retention time and a uniform distribution with respect to the coating composition rather than a twin-screw extruder capable of providing stable delivery, a long retention time, and a wide distribution with respect to the coating composition.

BRIEF DESCRIPTION OF THE DRAWINGS

FIG. 1 shows a coated paper according to an exemplary embodiment of the present invention.

DETAILED DESCRIPTION OF EMBODIMENTS

Hereinafter, the present invention will be understood and appreciated more fully from the following examples, and the examples are for illustrating the present invention and not for limiting the present invention. FIG. 1 shows a coated paper according to the present invention, and a polymer means aliphatic polycarbonate according to the present invention.

PREPARING EXAMPLE 1

Synthesis of Complex Compound 1

A complex compound 1 was synthesized according to the following Chemical Formula 3. A compound A was synthesized by the known method (Bull. Korean Chem. Soc. 2009, 30, 745-748).

[Chemical Formula 3]

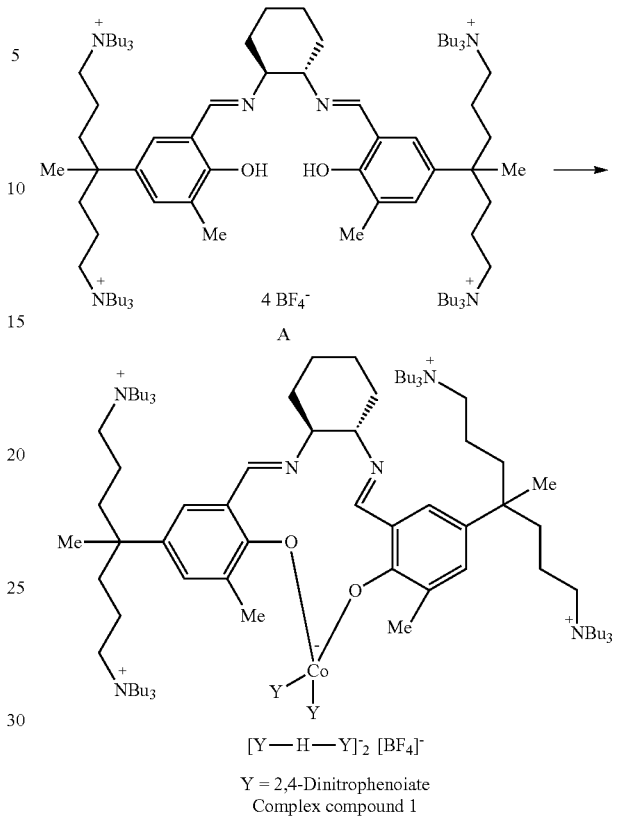

The compound A (0.376 g, 0.230 mmol) and Co(OAc)$_2$ (0.041 g, 0.230 mmol) were quantified and put into a 50 mL of a round flask within a glove box, and ethanol (17 mL) was added thereto, followed by stirring for 3 hours. 20 mL of diethylether was added thereto, thereby generating precipitation. The resulting material was filtered by using a glass filter and then washed with 10 mL of diethylether three times. The solvent was completely removed from the obtained orange solid under reduced pressure. The Co (II) compound (0.200 g, 0.117 mmol) obtained as described above was dissolved by inputting 2,4-Dinitrophenol (0.022 g, 0.117 mmol) thereinto and adding methylene chloride (5 mL) thereto. Then, the resultant was stirred for 3 hours under oxygen atmosphere to thereby be oxidized, and 60 mol % of sodium dinitrophenolate (0.121 g, 0.585 mmol) was added thereto, followed by stirring for 12 hours. The resultant was filtered by using a glass filter to remove a solid therefrom. The solvent was removed from the obtained methylene chloride solution under reduced pressure, thereby obtaining a reddish-brown solid (0.284 g, 0.111 mmol). Yield 95%, $^1$HNMR(dmso-d$_6$,40° C.): δ 8.62(br, 3H,(NO$_2$)$_2$C$_6$H$_3$O), 8.03(br,3H,(NO$_2$)$_2$C$_6$H$_3$O),7.87(br,1H,CH=N),7.41-7.22 (br,2H, m-H), 6.71(br,3H,(NO$_2$)$_2$C$_6$H$_3$O),3.62(br,1H, cyclohexyl-CH), 3.08(br,16H,NCH$_2$),2.62(s,3H,CH$_3$),2.09 (1H, cyclohexyl-CH), 1.89(1H,cyclohexyl-CH),1.72-1.09(br, 37H),0.87(br,18H,CH$_3$)ppm.

PREPARING EXAMPLE 2

Synthesis of Complex Compound 2

A complex compound 2 was synthesized according to the following Chemical Formula 4. A compound B was synthesized by the known method (Bull. Korean Chem. Soc. 2009, 30, 745-748).

[Chemical Formula 4]

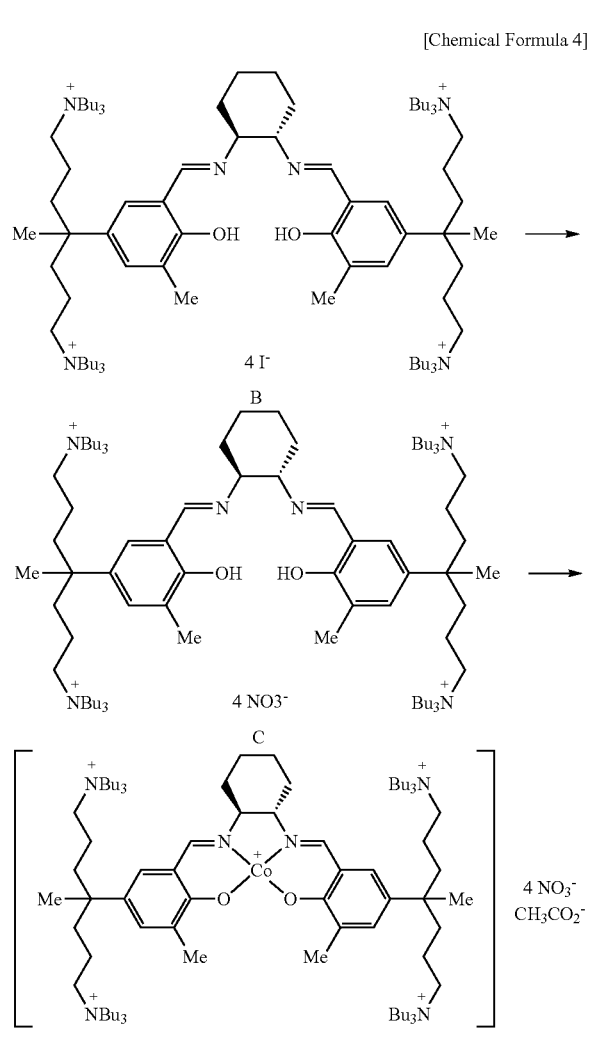

Complex compound 2

Synthesis of Compound C

The compound B (100 mg, 0.054 mmol) and AgNO₃ (37.3 mg, 0.219 mmol) were dissolved in ethanol (3 mL), followed by stirring overnight. The mixture was filtered by using celite, thereby removing generated AgI. The solvent was removed by vacuum suction, thereby obtaining yellow solid powder type compound C (0.80 g, 94%).

$^1$H NMR (CDCl₃): δ 13.51(s,2H,OH), 8.48(s,2H, CH=N), 7.15(s,4H,m-H),3.44(br,2H,cyclohexyl-CH), 3.19 (br,32H,NCH₂),2.24(s,6H,CH₃),1.57-1.52(br,4H,cyclohexyl-CH₂),1.43-1.26(br,74H),0.90-0.70(br,36H,CH₃)ppm.

Synthesis of Complex Compound 2

The compound C (95 mg, 0.061 mmol) and Co(OAc)2 (10.7 mg, 0.061 mmol) were put into a flask, and dissolved by adding 3 mL of methylene chloride thereto. The resultant material was stirred at room temperature for 3 hours under oxygen gas, and the solvent was removed under reduced pressure, thereby obtaining a brown solid powder type complex compound 2 (85 mg, 83%).

$^1$H NMR (DMSO-d₆,38° C.): major signal set, δ 7.83(s, 2H,CH=N),7.27(br s,2H,m-H), 7.22, 7.19 (br s,2H, m-H), 3.88(br,1H,cyclohexyl-CH),3.55(br,1H,cyclohexyl-CH), 3.30-2.90(br,32H,NCH₂),2.58(s,3H,CH₃),2.55(s,3H,CH₃), 2.10-1.80(br,4H,cyclohexyl-CH₂),1.70-1.15(br m,74H),1.0-0.80(br,36H,CH₃)ppm; miner signal set, δ 7.65(s,2H, CH=N),7.45(s,2H,m-H),7.35(s,2H, m-H), 3.60(br,2H, cyclohexyl-CH),3.30-2.90(br,32H,NCH₂),2.66(s,6H,CH₃), 2.10-1.80(br,4H,cyclohexyl-CH₂),1.70-1.15(br m,74H),1.0-0.80(br,36H,CH₃)ppm.

$^1$H NMR (CD₂Cl₂): δ 7.65(br,2H,CH=N),7.34(br,2H,m-H), 7.16(br,2H,m-H),3.40-2.00(br,32H,NCH₂),2.93(br s,6H,CH₃),2.10-1.80(br m,4H,cyclohexyl-CH₂),1.70-1.15 (br m,74H),1.1-0.80(br,36H,CH₃)ppm.

PREPARING EXAMPLE 3

Synthesis of Copolymer (PPC) using carbon dioxide/propyleneoxide

Propylene oxide (1162 g, 20.0 mol) in which the complex compound 1 (0.454 g, which is an amount calculated according to a monomer/catalyst ratio) was dissolved and injected to 3 L of an autoclave reactor through a cannula. The complex compound 1 prepared according to the Preparing Example 1 was used as the complex compound. Carbon dioxide was injected to the reactor at a pressure of 17 bars, and the mixture was stirred while increasing a temperature of the reactor in a circulation water bath of which a temperature is previously set to 70° C. After 30 minutes, the time point when a pressure of the carbon dioxide starts to fall was recorded, and reaction is performed for 2 hours from the time point, then the reaction was terminated by degassing of carbon dioxide. 830 g of propylene oxide was further added into the obtained viscous solution to lower viscosity of the solution, and then was passed through silica gel (50 g, Merck Company, 0.040 to 0.063 mm particle size (230 to 400 mesh)) pads, thereby obtaining a colorless solution. A monomer was removed by vacuum to obtain 283 g of white solid. The obtained polymer had a weight average molecular weight (Mw) of 290,000 and a polydispersity index (PDI) of 1.30. The weight average molecular weight and polydispersity index of the obtained polymer were measured by using GPC.

PREPARING EXAMPLE 4

Synthesis of Copolymer (PPC) using carbon dioxide/propyleneoxide

Propylene oxide (1162 g, 20.0 mol) in which the complex compound 2 (0.224 g, which is an amount calculated according to a monomer/catalyst ratio) was dissolved and injected to 3 L of an autoclave reactor through a cannula. The complex compound 2 prepared according to the Preparing Example 2 was used as the complex compound. Carbon dioxide was input to the reactor at a pressure of 17 bars, and the mixture was stirred while increasing a temperature of the reactor in a circulation water bath of which a temperature is previously set to 70° C. After 30 minutes, the time point when a pressure of the carbon dioxide starts to fall was recorded, and reaction is performed for 2 hours from the time point, then the reaction was terminated by degassing of carbon dioxide. 830 g of propylene oxide was further added into the obtained viscous solution to lower viscosity of the solution, and then was passed through silica gel (50 g, Merck Company, 0.040 to 0.063 mm particle size (230 to 400 mesh)) pads, thereby obtaining a colorless solution. A monomer was removed by vacuum to obtain 348 g of white solid. The obtained polymer had a weight average molecular weight (Mw) of 316,000 and a polydispersity index (PDI) of 1.78. The weight average molecular weight and polydispersity index of the obtained polymer were measured by using GPC.

PREPARING EXAMPLE 5

Synthesis of Terpolymer using carbon dioxide/propylene oxide/cyclohexene oxide ($CO_2$/PO/CHO Ter Polymer)

Propylene oxide (622.5 g, 10.72 mol) in which the complex compound 1 (0.406 g, which is an amount calculated according to a monomer/catalyst ratio) was dissolved, cyclohexene oxide (701.2 g, 7.14 mol) were injected to 3 L of an autoclave reactor through a cannula. The complex compound 2 prepared according to the Preparing Example 2 was used as the complex compound. Carbon dioxide was input to the reactor at a pressure of 17 bars, and the mixture was stirred while increasing a temperature of the reactor in a circulation water bath of which a temperature is previously set to 70° C. After 30 minutes, the time point when a pressure of the carbon dioxide starts to fall was recorded, and reaction is performed for 2 hours from the time point, then the reaction was terminated by degassing of carbon dioxide. 830 g of propylene oxide was further added into the obtained viscous solution to lower viscosity of the solution, and then was passed through silica gel (50 g, Merck Company, 0.040 to 0.063 mm particle size (230 to 400 mesh)) pads, thereby obtaining a colorless solution. A monomer was removed by vacuum to obtain 283 g of white solid.

The obtained polymer had a weight average molecular weight (Mw) of 210,000 and a polydispersity index (PDI) of 1.26, and a ratio of cyclohexene carbonate in the polymer was 25 mol %. The weight average molecular weight and polydispersity index of the obtained polymer were measured by using GPC, and the ratio of the cyclohexene carbonate in the polymer was calculated by analyzing $^1$H NMR spectrum.

EXAMPLE 1

The polypropylene carbonate (PPC) having an average molecular weight of 150,000, which was prepared in the Preparing Example 3, was extruded through a T-die single screw extruder (Brabender Company) and continuously coated on a paper.

An extruding barrel of the extruder was consisted of 4 parts, and temperatures thereof were 150° C., 170° C., 200° C., and 200° C., respectively. A temperature of T-die was 200° C. In this case, the manufactured coated paper had a total thickness of 200 μm and a coating thickness of 15 μm.

EXAMPLE 2

The coated paper was manufactured by the same method as in Example 1 except that temperatures of the 4 parts of the extruding barrel in the extruder were 180° C., 210° C., 220° C., and 230° C., respectively, and a temperature of T-die was 230° C. In this case, the manufactured coated paper had a total thickness of 200 μm and a coating thickness of 11 μm.

EXAMPLE 3

The coated paper was manufactured by the same method as in Example 1 except that PPC, polypropylene, and polyethylene mixed at a weight ratio of 7:2:1 were used instead of PPC, temperatures of the 4 parts of the extruding barrel in the extruder were 150° C., 200° C., 210° C., and 210° C., respectively, and a temperature of T-die was 210° C.

Homo polypropylene (H893S, SK Global Chemical Co.) having a melt index (MI: a flow amount of a melted resin under a load of 2.16 kg and at 230° C. for 10 minutes) of 33 was used as the polypropylene, and low density polyethylene (LDPE: XL700, Honam Petrochemical Co.) having a MI of 12 was used as the polyethylene.

The manufactured coated paper had a total thickness of 200 μm and a coating thickness of 15 μm.

EXAMPLE 4

The coated paper was manufactured by the same method as in Example 13 except that PPC, polypropylene, and polyethylene mixed at a weight ratio of 6:2:1 were used instead of PPC.

Homo polypropylene (H893S, SK Global Chemical Co.) having a melt index (MI: a flow amount of a melted resin under a load of 2.16 kg and at 230° C. for 10 minutes) of 33 was used as the polypropylene, and low density polyethylene (LDPE: XL700, Honam Petrochemical Co.) having a MI of 12 was used as the polyethylene.

The manufactured coated paper had a total thickness of 200 μm and a coating thickness of 16 μm.

COMPARATIVE EXAMPLE 1

The coated paper was manufactured by the same method as in Example 1 except that polyethylene was used instead of PPC, An extruding barrel of the extruder is consisted of 4 parts, and temperatures of the 4 parts were 270° C., 300° C., 320° C., and 320° C., respectively, and a temperature of T-die was 320° C.

The manufactured coated paper had a total thickness of 200 μm and a coating thickness of 15 μm

EXPERIMENTAL EXAMPLE 1

Physical properties of the manufactured Examples 1 to 4 were measured and shown in Table 1.

In Table 1, coating characteristics were evaluated as follows.

<Evaluation on Coating Properties>
O: The coated surface had a good appearance and a uniform coating thickness.
Δ: The coated surface had a good appearance but a variation in coating thickness.
X: The coated surface had a bad appearance and bubbles, and the like.

In Table 1, heat-resistant temperatures were evaluated as follows.

<Evaluation on Heat-Resistant Temperatures>
The upper limit temperature at which delamination or deformation of a coated surface does not occur for 30 minutes in a state in which the manufactured coated paper is put into a water bath and a constant temperature was maintained.

TABLE 1

|  | Unit | Example 1 | Example 2 | Example 3 | Example 4 | Comparative Example 1 |
|---|---|---|---|---|---|---|
| Coating Thickness | μm | 15 | 11 | 15 | 16 | 15 |

TABLE 1-continued

| | Unit | Example 1 | Example 2 | Example 3 | Example 4 | Comparative Example 1 |
|---|---|---|---|---|---|---|
| Oxygen Permeability | cc/m²day (23□, RH 0%) | 121 | 182 | 340 | 510 | >5,000 |
| Water Permeability | g/m²day (38□, RH 100%) | 143 | 201 | 90 | 85 | 48 |
| Coating Properties | — | ○ | x | ○ | ○ | ○ |
| Heat-resistant Temperature | □ | 85 | 85 | ≥100 | ≥100 | 100 |
| Heat Seal | □ | 90 | 90 | 150 | 140 | 130 |

As set forth above, the coated paper manufactured according to the present invention may prevent food from being easily rotted when it is used for a food container due to excellent oxygen barrier property thereof. In addition, the resin composition for paper coating according to the present invention may facilitate coating due to excellent printability and adhesion thereof. In addition, the coated paper has heat resistance higher than the existing polyethylene coated paper, such that the coated paper may be used in a microwave oven having high power.

What is claimed is:

1. A resin composition for paper-coating comprising: 30 to 40 weight %, based on the total amount of the composition, of a polyolefin-based resin including a mixture of homo polypropylene and low-density polyethylene and 60 to 70 weight %, based on the total amount of the composition, of an aliphatic polycarbonate resin having an average molecular weight of 30,000 to 300,000 obtained by reacting carbon dioxide with at least one epoxide compound selected from a group consisting of (C2-C10)alkylene oxide substituted or unsubstituted with halogen or alkoxy; (C4-C20)cycloalkylene oxide substituted or unsubstituted with halogen or alkoxy; and (C8-C20)styrene oxide substituted or unsubstituted with halogen, alkoxy, alkyl or aryl.

2. The resin composition for paper-coating of claim 1, wherein the polyolefin-based resin has a melt index (MI) of 0.5 to 100.

3. The resin composition for paper-coating of claim 1, wherein the aliphatic polycarbonate is represented by the following Chemical Formula 1.

[Chemical Formula 1]

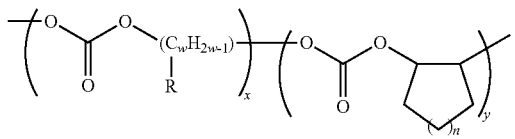

4. The resin composition for paper-coating of claim 1, wherein the aliphatic polycarbonate has a melt index (MI, 150° C./5 kg) of 0.1 to 20.

5. The resin composition for paper-coating of claim 1, further comprising:
one additive selected from a pigment, a dye, a filler, an antioxidant, a sunscreen agent, an antistatic agent, an anti-blocking agent, a slip agent, an inorganic filler, a compatibilizer, a stabilizer, a tackifier resin, a modified resin, a leveling agent, a fluorescent whitening agent, a dispersant, a heat stabilizer, a photo-stabilizer, an ultraviolet absorber, and a lubricant.

6. A paper coating method of extrusion-coating the resin composition for paper-coating of claim 1 on paper at 130 to 250° C. to manufacture a coated paper.

7. A paper coating method of extrusion-coating the resin composition for paper-coating of claim 2 on paper at 130 to 250° C. to manufacture a coated paper.

8. A paper coating method of extrusion-coating the resin composition for paper-coating of claim 3 on paper at 130 to 250° C. to manufacture a coated paper.

9. A paper coating method of extrusion-coating the resin composition for paper-coating of claim 4 on paper at 130 to 250° C. to manufacture a coated paper.

10. A paper coating method of extrusion-coating the resin composition for paper-coating of claims 5 on paper at 130 to 250° C. to manufacture a coated paper.

11. The paper coating method of claim 6, wherein at the time of coating, a coating thickness is 1 to 50 μm.

12. The paper coating method of claim 7, wherein at the time of coating, a coating thickness is 1 to 50 μm.

13. The paper coating method of claim 8, wherein at the time of coating, a coating thickness is 1 to 50 μm.

14. The paper coating method of claim 9, wherein at the time of coating, a coating thickness is 1 to 50 μm.

15. The paper coating method of claim 10, wherein at the time of coating, a coating thickness is 1 to 50 μm.

* * * * *

UNITED STATES PATENT AND TRADEMARK OFFICE
CERTIFICATE OF CORRECTION

PATENT NO. : 9,598,603 B2
APPLICATION NO. : 13/682908
DATED : March 21, 2017
INVENTOR(S) : Min Ho Jeon et al.

Page 1 of 1

It is certified that error appears in the above-identified patent and that said Letters Patent is hereby corrected as shown below:

In the Claims

Column 9, Line 42, Claim 3, after "polycarbonate" insert -- resin --

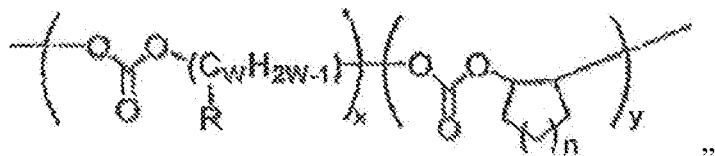

Column 9, Lines 45-50, Claim 3, after " " insert -- [Where, w is an integer of 2 to 10, x is an integer of 5 to 100, y is an integer of 0 to 100, n is an integer of 1 to 3, and R is hydrogen, (C1-C4)alkyl, or –CH2--0--R' (R' is (C1-C8)alkyl).] --

Column 10, Line 16, Claim 4, after "polycarbonate" insert -- resin --

Column 10, Line 40, Claim 10, delete "claims" and insert -- claim --

Signed and Sealed this
Sixteenth Day of May, 2017

Michelle K. Lee
*Director of the United States Patent and Trademark Office*